(12) United States Patent
Chaudhari et al.

(10) Patent No.: US 11,544,160 B2
(45) Date of Patent: Jan. 3, 2023

(54) IPS SOC PLL MONITORING AND ERROR REPORTING

(71) Applicant: Intel Corporation, Santa Clara, CA (US)

(72) Inventors: Prashant D. Chaudhari, Folsom, CA (US); Michael N. Derr, El Dorado Hills, CA (US); Bradley Coffman, Hillsboro, OR (US); Arthur Jeremy Runyan, Folsom, CA (US); Gustavo Patricio Espinosa, Portland, OR (US); Daniel James Knollmueller, Phoenix, AZ (US); Ivan Rodrigo Herrera Mejia, El Dorado Hills, CA (US)

(73) Assignee: Intel Corporation, Santa Clara, CA (US)

( * ) Notice: Subject to any disclaimer, the term of this patent is extended or adjusted under 35 U.S.C. 154(b) by 567 days.

(21) Appl. No.: 16/456,403

(22) Filed: Jun. 28, 2019

(65) Prior Publication Data

US 2020/0117554 A1  Apr. 16, 2020

(51) Int. Cl.
| | |
|---|---|
| *G06F 11/16* | (2006.01) |
| *G06F 13/42* | (2006.01) |
| *G06F 11/07* | (2006.01) |
| *G06F 1/04* | (2006.01) |

(52) U.S. Cl.
CPC ...... *G06F 11/1604* (2013.01); *G06F 11/1679* (2013.01); *G06F 13/4291* (2013.01); *G06F 1/04* (2013.01); *G06F 11/0751* (2013.01); *G06F 11/0766* (2013.01); *G06F 11/0772* (2013.01)

(58) Field of Classification Search
CPC ............ G06F 11/0772; G06F 11/0751; G06F 11/0766; G06F 1/04; G06F 11/1604; G06F 11/1679; G06F 13/4291
USPC ..................... 713/503, 500; 714/798, 48, 57
See application file for complete search history.

(56) References Cited

U.S. PATENT DOCUMENTS

| | | | |
|---|---|---|---|
| 2007/0096782 A1* | 5/2007 | Ngo | .......................... H03L 7/18 327/156 |
| 2012/0105112 A1* | 5/2012 | Davis | .................. G06F 11/1604 327/142 |
| 2017/0255223 A1* | 9/2017 | Bansal | ...................... G06F 1/04 |
| 2018/0121280 A1* | 5/2018 | Sanders | ..................... G06F 1/12 |
| 2019/0052277 A1* | 2/2019 | Rapeta | ..................... H03L 7/081 |
| 2019/0094902 A1* | 3/2019 | Kaneko | ............. G01R 31/3181 |
| 2019/0114235 A1* | 4/2019 | Wojewoda | .......... G06F 11/1679 |
| 2019/0147647 A1* | 5/2019 | Rudin | ....................... G06T 7/30 382/103 |

\* cited by examiner

*Primary Examiner* — Ji H Bae
(74) *Attorney, Agent, or Firm* — Schwegman Lundberg & Woessner, P.A.

(57) ABSTRACT

The systems and methods described herein provide the ability to detect a clocking element fault within an IC device and switch to an alternate clock. In response to detection of a fault in a phase-lock-loop (PLL) clocking element, the device may switch to an alternate clock so that error reporting logic can make forward progress on generating error message. The error message may be generated within an Intellectual Property (IP) cores (e.g., IP blocks), and may send the error message from the IP core to a system-on-a-chip (SOC), such as through an SOC Functional Safety (FuSA) error reporting infrastructure. In various examples, the clocking error may also be output to a hardware SOC pin, such as to provide a redundant path for error indication.

25 Claims, 5 Drawing Sheets

IPS SOC PLL MONITORING AND ERROR REPORTING

TECHNICAL FIELD

Embodiments described herein generally relate to integrated circuit (IC) devices.

BACKGROUND

Increasingly, there is demand for mission-critical systems that maximize operational time and minimize device faults, such as in autonomous vehicle navigation environments. For these mission-critical systems, IC devices may be monitored and errors reported so that appropriate corrective action can be taken. However, these monitoring and error-reporting functions themselves often require clocking elements and other internal components that may have their own transient or permanent faults, which may in turn cause functional safety risks. What is needed is improved IC device monitoring and error-reporting.

DESCRIPTION OF EMBODIMENTS

The subject matter disclosed herein provides various technical solutions facing IC devices. To address technical problems facing clocking element faults, this subject matter provides the ability to detect a clocking element fault and switching to an alternate clock. One technical problem facing IC devices is that circuitry that provides monitoring and error-reporting functionality may rely on the same clocking element as the IC device itself, so a fault in the clocking element also causes a fault in the monitoring and error-reporting circuitry. In an example of this technical solution, in response to detection of a fault in a phase-lock-loop (PLL) clocking element, the device may switch to an alternate clock so that error reporting logic can make forward progress on generating error message. The error message may be generated within an Intellectual Property (IP) cores (e.g., IP blocks), and may send the error message from the IP core to a system-on-a-chip (SOC), such as through an SOC Functional Safety (FuSA) error reporting infrastructure. In an example, an IP core may include a power management agent (PMA), which may provide a power management (PM) event message responsive to a clocking error from the IP core to a central PM controller on the SOC. In various examples, the clocking error may also be output to a hardware SOC pin, such as to provide a redundant path for error indication.

The technical solutions described herein provide various technical advantages. In an example, these solutions improve the functional safety capability of various IC devices. These solutions also enable IC devices to achieve higher functional safety capabilities, such as by providing solutions to functional safety challenge facing clocking of functional IP cores and dependent error reporting logic. These improvements to functional safety of IC devices will improve safety, reliability, and performance of IC devices, such as for autonomous vehicle SOC devices and industrial SOC devices.

These technical solutions may be used in various technologies, such as one or more IP cores, in Intel® Display Engine, Intel field-programmable gate array (FPGA) IP Core, the Intel® Gen1.2.x Graphics IP Core inside of Alder Lake (ADL) SOC microarchitecture, or other FPGA or application-specific integrated circuit (ASIC) devices.

The following description and the drawings illustrate example embodiments, though other embodiments may incorporate structural, logical, electrical, process, and other changes. Portions and features of various embodiments may be included in, or substituted for, those of other embodiments. Embodiments set forth in the claims encompass all available equivalents of those claims.

Figure 1:
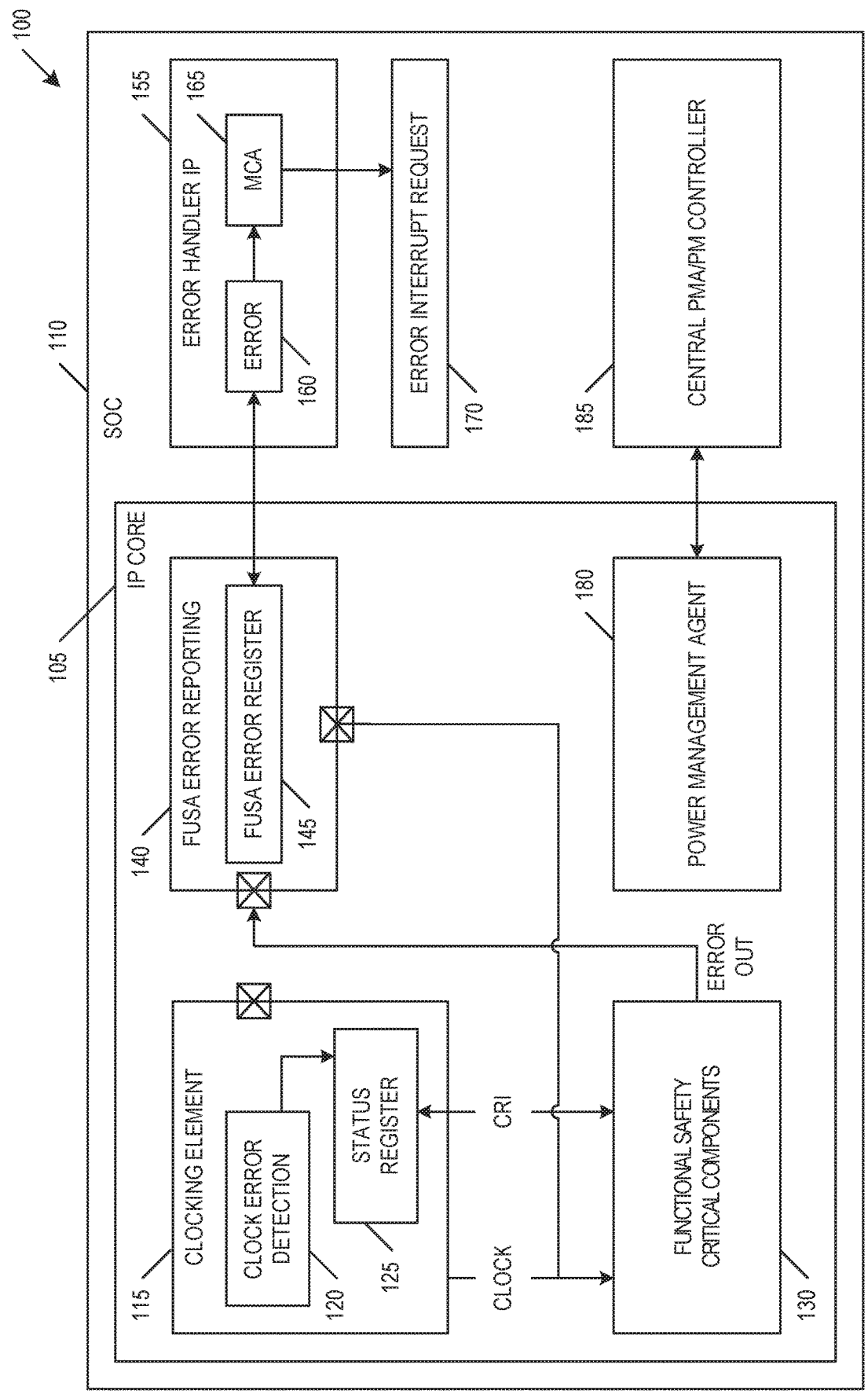
FIG. 1 is a block diagram of a first clocked IC device, in accordance with at least one embodiment.

FIG. 1 is a block diagram of a first clocked IC device 100, in accordance with at least one embodiment. Device 100 may include an IP core 105, which may be resident within a SOC device 110. The IP core 105 and the SOC device 110 may be implemented on a common IC die, and may be implemented as separate functional, logical, or physical devices. In an example, IP core 105 and one or more additional IP cores (not shown) may be within SOC device 110. The IP core 105 includes a clocking element 115, such as a phase-locked loop. The clocking element 115 may provide a clock output to one or more components within the IP core 105, such as to the functional safety (FUSA) critical components 130 or to the FUSA error reporting component 140.

The clocking element 115 may include a clock error detection component 120 and a status register 125. The clock error detection component 120 may detect a clock error, and may send a notification of the clock error to the status register 125. In an example, the clocking element 115 includes a PLL, and the detected clock error includes a PLL unexpected unlock error. The status register 125 may store various status register values, and may provide information about one or more of these status register values to other components. The status register 125 may provide an indication of the clock error to one or more FUSA critical components 130, such as via a control register interrupt (CRI). The FUSA critical components 130 may include hardware to identify and respond to logic functionality errors, internal RAMs (e.g., SSAs), data transferring buses, built in self-test, and other functional safety critical aspects.

In response to the indication of the clock error, the FUSA critical components 130 may send an error out indication to the FUSA error reporting component 140. The FUSA error reporting component 140 may include a FUSA error register 145 to store a FUSA error notification in response to receiving the error out indication from the FUSA critical components 130. In an example, the FUSA error register 145 includes a FUSA peripheral component interconnect express (PCNL) register, which may be used to communicate with the SOC device 110 via a side bus, such as via an Intel® On-Chip System Fabric (IOSF) sideband bus interface.

The SOC device 110 may receive an indication of the FUSA error notification at an error handler IP component 155. The error handling error handler IP component 155 may include an error component 160 and a machine check architecture (MCA) component 165 to receive the indication of the FUSA error notification and generate an error interrupt request 170. The error interrupt request 170 may include various information about the error, such as the type of clock error, the error category, or other error information.

The IP core 105 may also include a power management agent (PMA) 180. The PMA 180 may be used to control power applied to one or more components with in the IP core 105, such as by modifying voltage or current levels. The PMA 180 may enable the IP core 105 to operate at a voltage or frequency that may be different from other functional or logical devices, which may improve power efficiency and performance of the IP core 105. The PMA 180 may interact with a central PMA or other power management (PM) controller 185 on the SOC device 110, such as to improve power efficiency or performance of both the IP core 105 and the SOC device 110.

Figure 2:
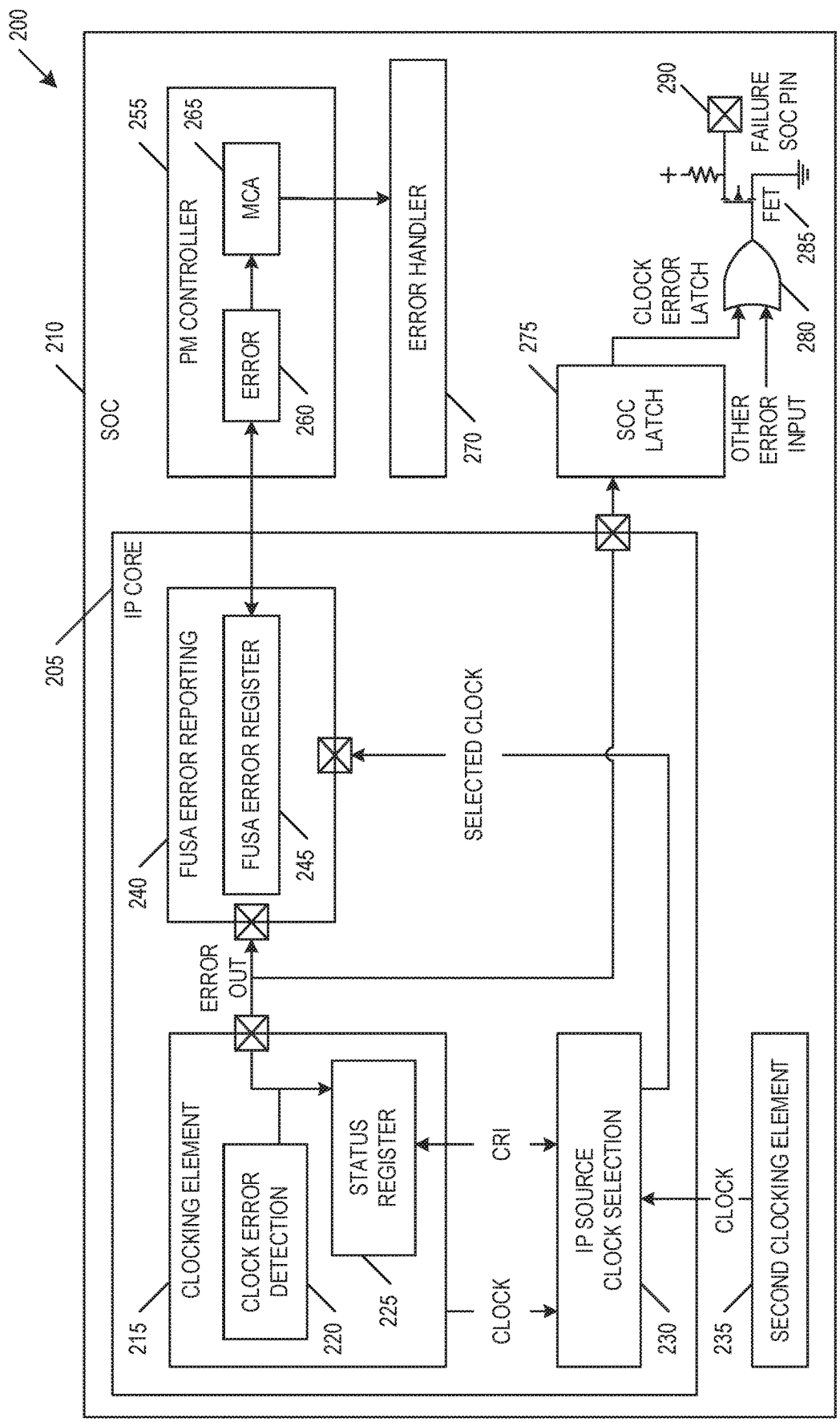
FIG. 2 is a block diagram of a second clocked IC device, in accordance with at least one embodiment.

FIG. 2 is a block diagram of a second clocked IC device 200, in accordance with at least one embodiment. Device 200 may include an IP core 205 and a SOC device 210. The IP core 205 includes a clocking element 215 that provides a clock output, such as a crystal oscillator (CRO), PLL, or other clocking IC device. The clocking element 215 may include a clock error detection component 220 to detect a clock error, and may send a notification of the clock error to the status register 225. The status register 225 may include a common register interface, and may provide an indication of the clock error to an IP source clock selection device 230. In response to the indication of the clock error, the IP source clock selection device 230 may switch from using a first clock input from the clocking element 215 to a second clocking element 235. The second clocking element 235 may include a CRO, a PLL, or other clocking element. The second clocking element 235 does not need to have been be synchronized with the first clocking element 215 to provide the error reporting functionality described herein.

Device 200 may include a FUSA error reporting component 240. The clock error detection component 220 may send an error output directly to the FUSA error reporting component 240. The FUSA error reporting component 240 may include a FUSA error register 245 to store a FUSA error notification in response to receiving the error out indication from the clock error detection component 220. The FUSA error reporting component 240 may receive a selected clock signal from the IP source clock selection device 230, and may use the selected clock signal to process the error output and store the FUSA error notification in the FUSA error register 245. In an example, the FUSA error register 245 includes a FUSA PCIE register, which may be used to communicate with the SOC device 210 via a sideband bus.

The SOC device 210 may receive an indication of the FUSA error notification at a power management (PM) controller 255. The PM controller 255 may include an error component 260 and an MCA component 265 to receive the indication of the FUSA error notification and communicate that error with an error handler 270. Error handler 270 may provide error logging, diagnostics, recovery, catastrophic error indication for clocking element 215, and other error handling features. Error handler 270 may be implemented in another IP core within the SOC 210, in a separate microcontroller outside the SOC 210, or in a separate custom ASIC outside the SOC 210. The diagnostics and recovery may include hardware reset and reconfiguration of clocking element 215. The diagnostics and recovery may also include switching to fallback operation with another IP core, switching to another minimal functional mode, or switching to use another SOC.

The IP core 205 may also send the error output from the IP core 205 directly to the SOC device 210. The error output may be received by a SOC latch 275 that provides a clock error latch output, such as a binary latched voltage level to indicate an error state. In an example, the SOC latch 275 holds the clock error latch output regardless of whether the error output received by the IP core 205 is no longer present. The SOC latch 275 may receive a latch input (not shown) that may cause the clock error latch output to indicate the error state is no longer present. The SOC device 210 may include a logic gate, such as logical OR gate 280. In an example, the OR gate 280 receives the clock error latch output and one or more other error inputs, such as hard fault inputs, errors from other IP cores, or other types of error inputs. One or more of the error inputs may be masked (e.g., prevented from propagating), which may be used to isolate a particular error or type of error, such as isolating only clock-related errors within the logical OR gate 280. The OR gate 280 may provide a combined error output, such as a logical high output whenever any one of the error latch output or other hard fault inputs indicate an error state. By combining errors through a logic gate, the SOC device 210 may reduce the number of error output hardware pins. The OR gate 280 may provide the combined error output to a transistor, such as FET 285. FET 285 may apply an error voltage level to a failure SOC pin 290, such as applying the rail voltage of SOC device 210 to failure SOC pin 290. The failure SOC pin 290 may be used to provide a voltage-based alternative indication of an error fault, which may improve troubleshooting or corrective actions applied to address the error in the clocking element 215.

Figure 3:
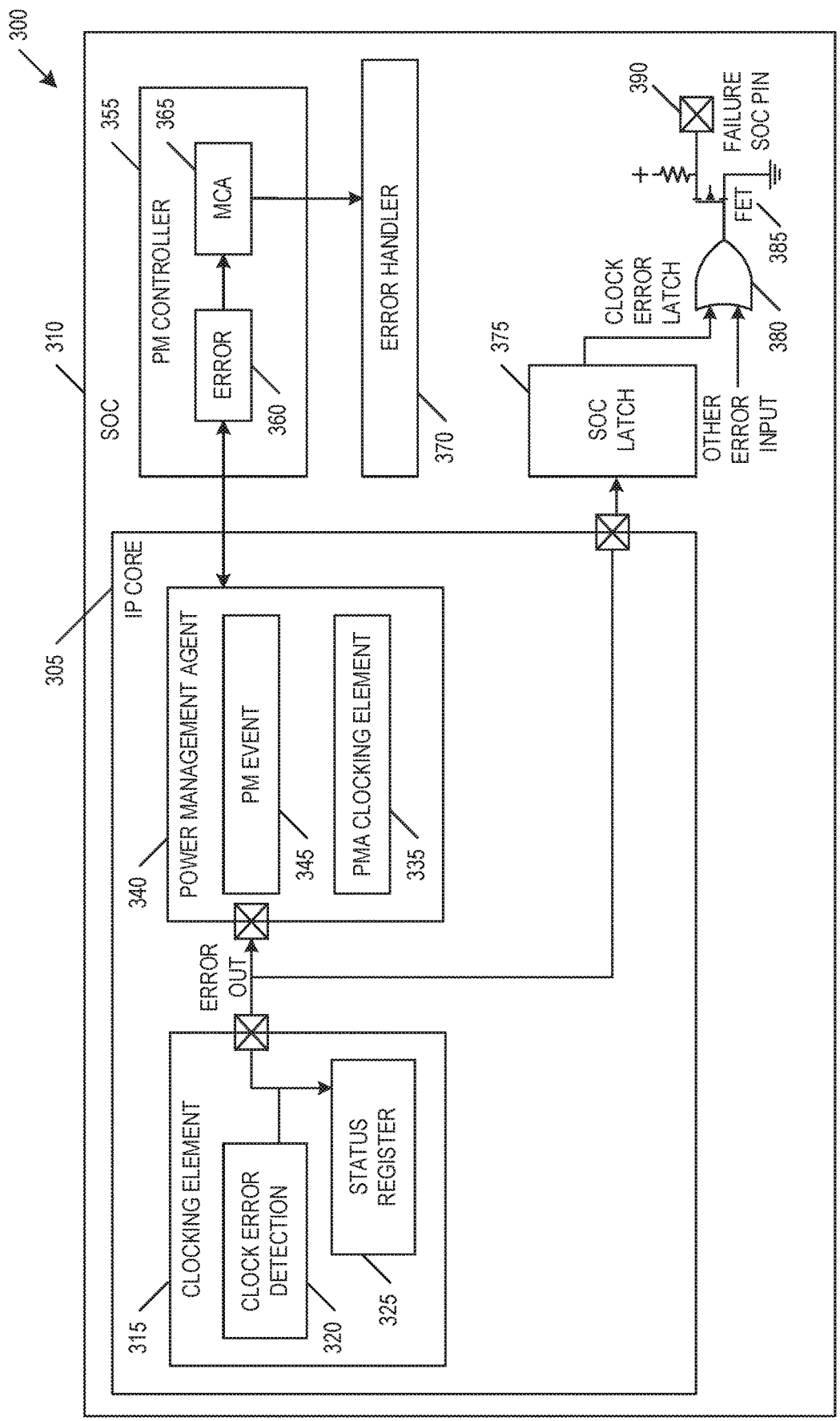
FIG. 3 is a block diagram of a third clocked IC device, in accordance with at least one embodiment.

FIG. 3 is a block diagram of a third clocked IC device 300, in accordance with at least one embodiment. Device 300 may include an IP core 305 and a SOC device 310. The IP core 305 includes a clocking element 315 that provides a clock output. The clocking element 315 may include a clock error detection component 320 to detect a clock error, and may send a notification of the clock error to the status register 325.

Device 300 may include a power management agent (PMA) 340. The clock error detection component 320 may send an error output directly to the PMA 340. The PMA 340 may include a power management (PM) event register 345 to store a clock error notification in response to receiving the error out indication from the clock error detection component 320. In an example, the PM event register 345 includes a PM PCIE register, which may be used to communicate with the SOC device 310 via a sideband bus. The PMA 340 may include a PMA clocking element 335, such as a PLL, crystal oscillator, or other clocking element. PMA clocking element 335 may provide a clock for the functional operation of the PMA 340, which allows the PMA 340 to continue to operate without depending on another clock source within the IP core 305. For example, the PMA clocking element 335 allows the PMA 340 to continue to operate even when an error occurs in clocking element 315, so that the PMA 340 is able to generate and send an error message to PM controller 355.

The SOC device 310 may receive an indication of the FUSA error notification at a PM controller 355. The PM controller 355 may include an error component 360 and an MCA component 365 to receive the indication of the PM error notification and communicate that error with an error handler 370. Error handler 370 may provide error logging, diagnostics, recovery, catastrophic error indication for docking element 315, and other error handling features. Error handler 370 may be implemented in another IP core within the SOC 310, in a separate microcontroller outside the SOC 310, or in a separate custom ASIC outside the SOC 310.

The IP core 305 may also send the error output from the IP core 305 directly to the SOC device 310. The error output may be received by a SOC latch 375 that provides a clock error latch output and holds the clock error latch output regardless of whether the error output received by the IP core 305 is no longer present. The SOC latch 375 may receive a latch input (not shown) that may cause the clock error latch output to indicate the error state is no longer present. The SOC device 310 may include a logic gate such as logical OR gate 380, which may receive and combine the clock error latch output and one or more other error inputs, such as hard fault inputs, errors from other IP cores, or other types of error inputs. One or more of the error inputs may be masked (e.g., prevented from propagating), which may be used to isolate a particular error or type of error, such as isolating only clock-related errors within the logical OR gate 380. The OR gate 380 may provide the combined error output to a transistor, such as FET 385. FET 385 may apply an error voltage level to a failure SOC pin 390, such as applying the rail voltage of SOC device 310 to failure SOC pin 390 to provide a voltage-based alternative indication of an error fault.

Various features may be used to detect one or more of devices 100, 200, or 300, such as through analysis of the components of an IC device, analysis of a circuit board trace routing or pin-out, reverse engineering, imaging (e.g., thermal imaging, electron imaging) of a silicon die, or other circuit analysis. Analysis may identify one or more of a clocking element, FUSA critical component device, FUSA error reporting component, PMA, IP source clock selection device, second clocking element, error handler IP component, error interrupt request, SOC latch, SOC logic gate, or failure SOC pin. In an example, a PLL functional failure may be induced by applying a stress condition, and imaging analysis of the silicon die may identify switching to a second clocking element or other operations described herein. These features may also be identified through application of or analysis of product literature, specifications, application notes, engineering notes, or other literature. In an example, feature documentation claiming safety features related to clocking hardware, Inks, safety ratings, and related descriptions can reveal the usage of operations described herein.

Figure 4:
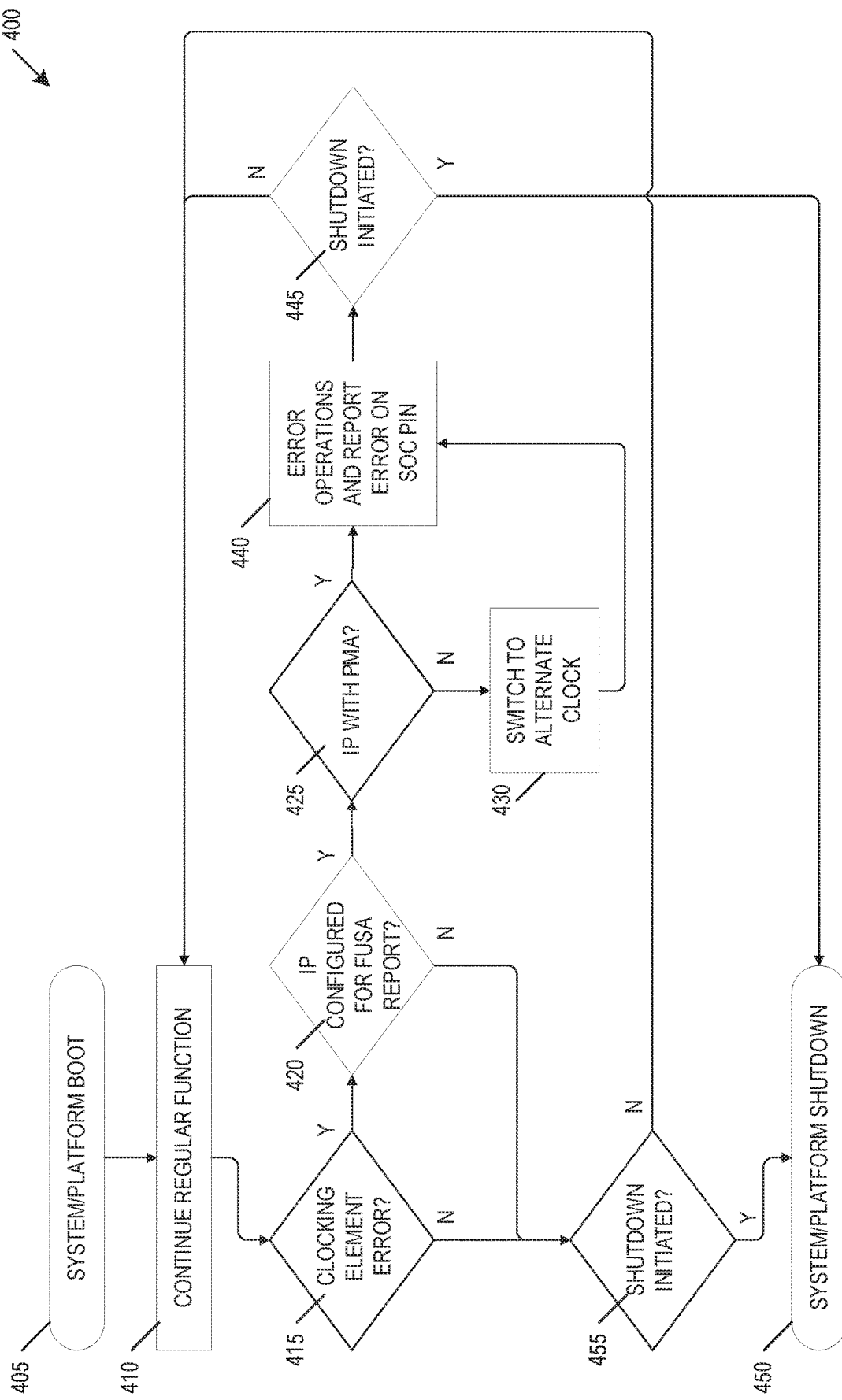
FIG. 4 is a flow diagram of a clocked IC method, in accordance with at least one embodiment.

FIG. 4 is a flow diagram of a clocked IC method 400, in accordance with at least one embodiment. Method 400 begins with a system or platform boot 405, then performs the regular function of the IC device 410. While performing the regular functions 410, method 400 includes checking for a clocking error 415, such as PLL unexpected unlock error.

Method 400 includes determining whether the IP core is configured for FUSA error reporting 420, and determining whether the IP core is configured with a PMA. If the IP core is configured with a PMA (decision operation 425), then PMA internal clock ensures proper error handling and reporting 440, such as error handling, error diagnostics, error recovery, error logging, error reporting on an SOC pin, and other operations. If the IP core is not configured with the PMA (decision operation 425), an IP source clock selection device switches to an alternate clock 430, such as a secondary PLL. Following switching the clock, the alternate clock ensures proper error handling and reporting 440.

Following completion of the error operations 440, method 400 includes determining whether a prior system shutdown was initiated 445. If a prior system shutdown was initiated, method 400 proceeds to a system or platform shutdown 450. If no prior system shutdown was initiated, method 400 proceeds to continue the regular function of the device 410 using the second clock. Similarly, if no clocking element error is detected 415 or if IP is not configured for FUSA reporting 420, method 400 includes determining whether a system or platform shutdown has been initiated 455, and proceeds accordingly to either continue the regular function of the device 410 or to platform shutdown 450.

Figure 5:
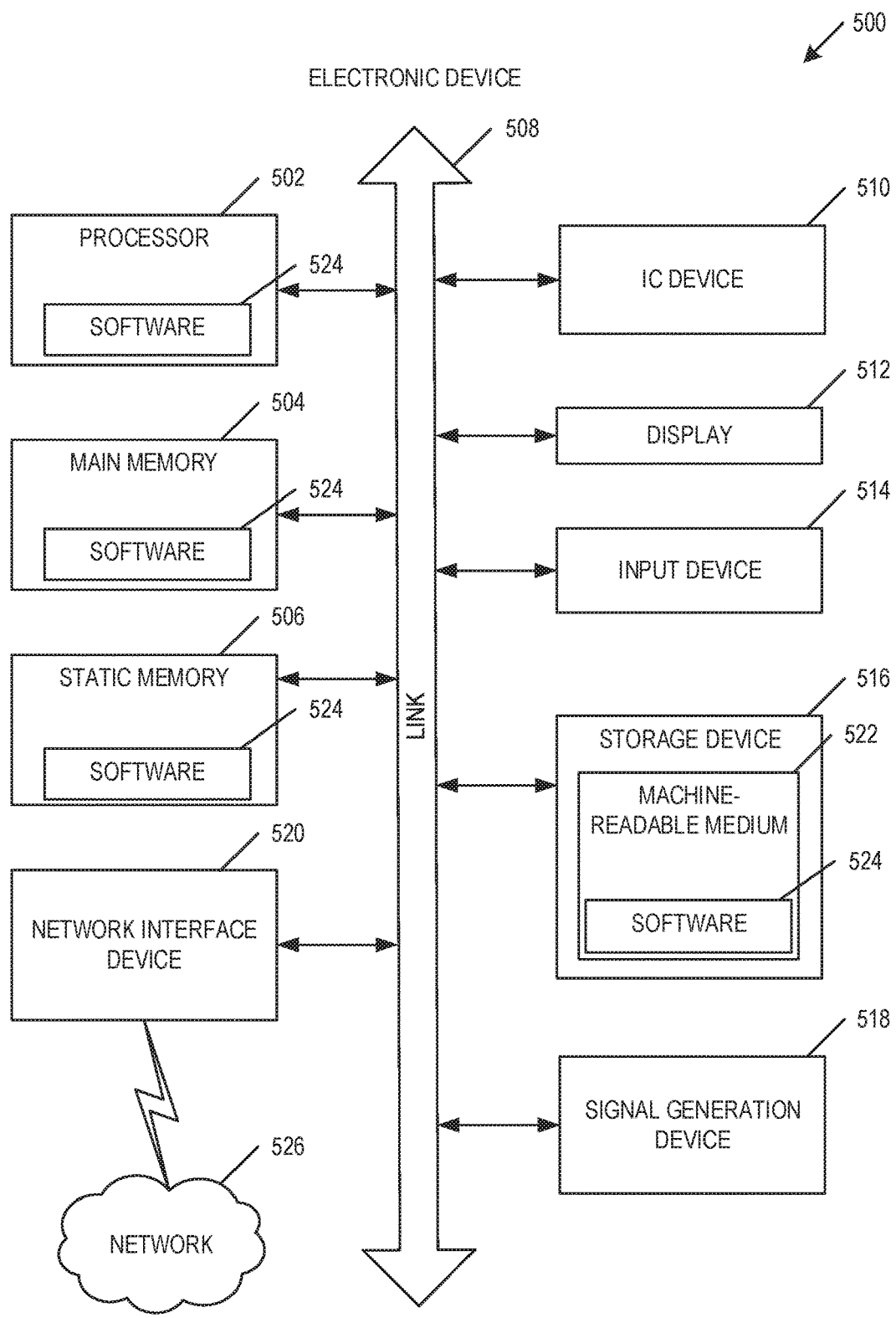
FIG. 5 is a block diagram illustrating a clocked IC system in the example form of an electronic device, within which a set or sequence of instructions may be executed to cause the machine to perform any one of the methodologies discussed herein, according to an example embodiment.

FIG. 5 is a block diagram illustrating a clocked IC system in the example form of an electronic device 500, within which a set or sequence of instructions may be executed to cause the machine to perform any one of the methodologies discussed herein, according to an example embodiment, Electronic device 500 may also represent the devices shown in FIGS. 1-3. In alternative embodiments, the electronic device 500 operates as a standalone device or may be connected (e.g., networked) to other machines. In a networked deployment, the electronic device 500 may operate in the capacity of either a server or a client machine in server-client network environments, or it may act as a peer machine in peer-to-peer (or distributed) network environments. The electronic device 500 may be a portable electronic device, a personal computer (PC), a tablet PC, a hybrid tablet, a personal digital assistant (PDA), a mobile telephone, or any electronic device 500 capable of executing instructions (sequential or otherwise) that specify actions to be taken by that machine to detect a user input. Further, while only a single electronic device 500 is illustrated, the terms "machine" or "electronic device" shall also be taken to include any collection of machines or devices that individually or jointly execute a set (or multiple sets) of instructions to perform any one or more of the methodologies discussed herein. Similarly, the term "processor-based system" shall be taken to include any set of one or more machines that are controlled by or operated by a processor (e.g., a computer) to execute instructions, individually or jointly, to perform any one or more of the methodologies discussed herein.

Example electronic device 500 includes at least one processor 502 (e.g., a central processing unit (CPU), a graphics processing unit (GPU) or both, processor cores, compute nodes, etc.), a main memory 504 and a static memory 506, which communicate with each other via a link 508 (e.g., bus).

The electronic device 500 includes an IC device 510, where the IC device 510 may include the IP core, SOC device, or other components as described above. In an example, electronic device 500 includes multiple SOC devices or multiple IP cores providing various functionality. The electronic device 500 may further include a display unit 512, where the display unit 512 may include a single component that provides a user-readable display and a protective layer, or another display type. The electronic device 500 may further include an input device 514, such as a pushbutton, a keyboard, an NEC card reader, or a user interface (UI) navigation device (e.g., a touch-sensitive input). The electronic device 500 may additionally include a storage device 516, such as a solid-state drive (SSD) unit. The electronic device 500 may additionally include a signal generation device 518 to provide audible or visual feedback, such as a speaker to provide an audible feedback or one or more LEDs to provide a visual feedback. The electronic device 500 may additionally include a network interface device 520, and one or more additional sensors (not shown), such as a global positioning system (GPS) sensor, compass, accelerometer, or other sensor.

The storage device 516 includes a machine-readable medium 522 on which is stored one or more sets of data structures and instructions 524 (e.g., software) embodying or utilized by any one or more of the methodologies or functions described herein. The instructions 524 may also reside, completely or at least partially, within the main memory 504, static memory 506, and/or within the processor 502 during execution thereof by the electronic device 500. The main memory 504, static memory 506, and the processor 502 may also constitute machine-readable media.

While the machine-readable medium 522 is illustrated in an example embodiment to be a single medium, the term "machine-readable medium" may include a single medium or multiple media (e.g., a centralized or distributed database, and/or associated caches and servers) that store the one or more instructions 524. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 524 may further be transmitted or received over a communications network 526 using a transmission medium via the network interface device 520 utilizing any one of a number of well-known transfer protocols (e.g., HTTP). Examples of communication networks include a local area network (LAN), a wide area network (WAN), the Internet, mobile telephone networks, and wireless data networks (e.g., Bluetooth, Bluetooth LE, 3G, 5G LTE/LTE-A, WiMAX networks, etc.). The term "transmission medium" shall be taken to include any intangible medium that is capable of storing, encoding, or carrying instructions for execution by the machine, and includes digital or analog communications signals or other intangible medium to facilitate communication of such software.

To better illustrate the method and apparatuses disclosed herein, a non-limiting list of embodiments is provided here.

Example 1 is a clocked integrated circuit (IC) system comprising: an integrated circuit (IC) core, the IC core including: a first clocking element to generate a first clock signal and a clock error detection signal, the clock error detection signal indicating a failure in the first clocking element; and a clocked error reporting device to generate a clock error event indication responsive to the clock error detection signal, the clocked error reporting device using a second clock signal from a second clocking element.

In Example 2, the subject matter of Example 1 optionally includes the IC core further including a clock selection device to change a clock selection, responsive to the clock error detection signal, from the first clock signal to the second clock signal generated by the second clocking element.

In Example 3, the subject matter of any one or more of Examples 1-2 optionally include a system-on-a-chip (SOC) device including an error handling device, the error handling device to: receive the clock error event indication from the IC core; and generate a clock error handler indication as a function of the clock error event indication.

In Example 4, the subject matter of Example 3 optionally includes wherein the clock error handler indication includes at least one of a clock error interrupt request or a clock error message.

In Example 5, the subject matter of any one or more of Examples 3-4 optionally include wherein the SOC device includes the IC core.

In Example 6, the subject matter of any one or more of Examples 3-5 optionally include the SOC device including: a SOC error pin; and an error latching circuitry to receive the error clock event indication and apply a changed voltage level to the SOC error pin, the changed voltage level indicating the failure in the first clocking element.

In Example 7, the subject matter of Example 6 optionally includes the error latching circuitry including an error latch, the error latch to output a latched error signal responsive to the error clock event indication.

In Example 8, the subject matter of any one or more of Examples 6-7 optionally include the error latching circuitry further including a field effect transistor to apply the changed voltage level to the SOC error pin responsive to the latched error signal, the changed voltage level based on a SOC device rail voltage.

In Example 9, the subject matter of any one or more of Examples 6-8 optionally include the error latching circuitry further including a logical OR gate to generate an OR signal output responsive to receiving at least one of the latched error signal and a hard fault error input, the changed voltage level applied responsive to the presence of the OR signal output.

In Example 10, the subject matter of any one or more of Examples 3-9 optionally include wherein: the first clocking element includes a clock status register to receive the clock error detection signal and generate a clock error register output responsive to the clock error detection signal; and the clock selection device includes a clock selection multiplexing device, the clock selection multiplexing device to: change the clock selection responsive to the clock error register output; and output the second clock signal to the clocked error reporting device.

In Example 11, the subject matter of Example 10 optionally includes the clock selection multiplexing device further to: receive a configuration reset input indicating a first clocking element error resolution; and change the clock selection, responsive to the clock error detection signal, from the second clock signal to the first clock signal.

In Example 12, the subject matter of any one or more of Examples 10-11 optionally include wherein: the first clocking element includes a first phase-locked loop (PLL); and the second clocking element includes a second PLL.

In Example 13, the subject matter of any one or more of Examples 3-12 optionally include a power management agent, the power management agent including the clocked error reporting device.

In Example 14, the subject matter of Example 13 optionally includes the power management agent further including the second clocking element internal to the power management agent, the power management agent using the second clock signal from the second clocking element for a plurality of power management agent operations.

Example 15 is a clocked integrated circuit (IC) method comprising: generating a first clock signal and a clock error detection signal at a first clocking element in an integrated circuit (IC) core, the clock error detection signal indicating a failure in the first clocking element; and generating, at a clocked error reporting device within the IC core and responsive to the clock error detection signal, a clock error event indication, the clocked error reporting device using a second clocking signal from a second clocking element.

In Example 16, the subject matter of Example 15 optionally includes changing, at a clock selection device and responsive to the clock error detection signal, a clock selection from the first clock signal to the second clock signal generated by the second clocking element.

In Example 17, the subject matter of any one or more of Examples 15-16 optionally include receiving the clock error event indication at a system-on-a-chip (SOC) device from an integrated circuit (IC) device, the IC device including the first clocking element, the second clocking element, and the clock selection element; and generating a clock error handler indication at the SOC device as a function of the clock error event indication.

In Example 18, the subject matter of Example 17 optionally includes wherein the clock error handler indication includes at least one of a clock error interrupt request or a clock error message.

In Example 19, the subject matter of any one or more of Examples 17-18 optionally include wherein the SOC device includes the IC device.

In Example 20, the subject matter of any one or more of Examples 17-19 optionally include receiving the error clock event indication at an error latching circuitry; and applying a changed voltage level to a SOC error pin, the changed voltage level indicating the failure in the first clocking element.

In Example 21, the subject matter of Example 20 optionally includes outputting a latched error signal from an error latch within the error latching circuitry responsive to the receipt of the error clock event indication at the error latch.

In Example 22, the subject matter of any one or more of Examples 20-21 optionally include applying, at field effect transistor within the error latching circuitry and responsive to the latched error signal, the changed voltage level to the SOC error pin, the changed voltage level based on a SOC device rail voltage.

In Example 23, the subject matter of Example 22 optionally includes generating an OR signal output at a logical OR gate within the error latching circuitry, wherein: the generation of the OR signal output is responsive to receiving at least one of the latched error signal and a hard fault error input; and the application of the changed voltage level to the SOC error pin is responsive to the presence of the OR signal output.

In Example 24, the subject matter of any one or more of Examples 17-23 optionally include receiving the clock error detection signal at a clock status register within the first clocking element; generating a clock error register output responsive to the receipt of the clock error detection signal; changing the clock selection at a clock selection multiplexing device within the clock selection device responsive to the clock error register output; and outputting the second clock signal from the clock selection multiplexing device to the clocked error reporting device.

In Example 25, the subject matter of Example 24 optionally includes receiving a configuration reset input at the clock selection multiplexing device, the configuration reset input indicating a first clocking element error resolution; and changing the clock selection, responsive to the clock error detection signal, from the second clock signal to the first clock signal.

In Example 26, the subject matter of any one or more of Examples 24-25 optionally include wherein: the first clocking element includes a first phase-locked loop (PLL); the second clocking element includes a second PLL.

In Example 27, the subject matter of any one or more of Examples 17-26 optionally include wherein: the IC core includes a power management agent; and the power management agent includes the second clocking element internal to the power management agent.

In Example 28, the subject matter of Example 27 optionally includes wherein the power management agent includes the clocked error reporting device.

Example 29 is at least one machine-readable medium including instructions, which when executed by a computing system, cause the computing system to perform any of the methods of Examples 15-28.

Example 30 is an apparatus comprising means for performing any of the methods of Examples 15-28.

Example 31 is at least one non-transitory machine-readable storage medium, comprising a plurality of instructions that, responsive to being executed with processor circuitry of a computer-controlled device, cause the computer-controlled device to: generate a first clock signal and a clock error detection signal at a first clocking element in an integrated circuit (IC) core, the clock error detection signal indicating a failure in the first clocking element; and generate, at a clocked error reporting device within the core and responsive to the clock error detection signal, a clock error event indication, the clocked error reporting device using a second clocking signal from a second clocking element.

In Example 32, the subject matter of Example 31 optionally includes the instructions further causing the computer-controlled device to change, at a clock selection device and responsive to the clock error detection signal, a clock selection from the first clock signal to the second clock signal generated by the second clocking element.

In Example 33, the subject matter of any one or more of Examples 31-32 optionally include the instructions further causing the computer-controlled device to: receive the clock error event indication at a system-on-a-chip (SOC) device from an integrated circuit (IC) device, the IC device including the first clocking element, the second clocking element, and the clock selection element; and generate a clock error handler indication at the SOC device as a function of the clock error event indication.

In Example 34, the subject matter of Example 33 optionally includes wherein the clock error handler indication includes at least one of a clock error interrupt request or a clock error message.

In Example 35, the subject matter of any one or more of Examples 33-34 optionally include wherein the SOC device includes the IC device.

In Example 36, the subject matter of any one or more of Examples 33-35 optionally include the instructions further causing the computer-controlled device to: receive the error clock event indication at an error latching circuitry; and apply a changed voltage level to a SOC error pin, the changed voltage level indicating the failure in the first clocking element.

In Example 37, the subject matter of Example 36 optionally includes the instructions further causing the computer-controlled device to output a latched error signal from an error latch within the error latching circuitry responsive to the receipt of the error clock event indication at the error latch.

In Example 38, the subject matter of any one or more of Examples 36-37 optionally include the instructions further causing the computer-controlled device to apply, at field effect transistor within the error latching circuitry and responsive to the latched error signal, the changed voltage level to the SOC error pin, the changed voltage level based on a SOC device rail voltage.

In Example 39, the subject matter of Example 38 optionally includes the instructions further causing the computer-controlled device to generate an OR signal output at a logical OR gate within the error latching circuitry, wherein: the generation of the OR signal output is responsive to receiving at least one of the latched error signal and a hard fault error input; and the application of the changed voltage level to the SOC error pin is responsive to the presence of the OR signal output.

In Example 40, the subject matter of any one or more of Examples 33-39 optionally include the instructions further causing the computer-controlled device to: receive the clock error detection signal at a clock status register within the first clocking element; generate a clock error register output responsive to the receipt of the clock error detection signal; change the clock selection at a clock selection multiplexing device within the clock selection device responsive to the clock error register output; and output the second clock signal from the clock selection multiplexing device to the clocked error reporting device.

In Example 41, the subject matter of Example 40 optionally includes the instructions further causing the computer-controlled device to: receive a configuration reset input at the clock selection multiplexing device, the configuration reset input indicating a first clocking element error resolution; and change the clock selection, responsive to the clock error detection signal, from the second clock signal to the first clock signal.

In Example 42, the subject matter of any one or more of Examples 40-41 optionally include wherein: the first clocking element includes a first phase-locked loop (PLL); the second clocking element includes a second PLL.

In Example 43, the subject matter of any one or more of Examples 33-42 optionally include wherein: the IC core includes a power management agent; and the power management agent includes the second clocking element internal to the power management agent.

In Example 44, the subject matter of Example 43 optionally includes wherein the power management agent includes the clocked error reporting device.

Example 45 is a clocked integrated circuit apparatus comprising: means for generating a first clock signal and a clock error detection signal at a first clocking element in an integrated circuit (IC) core, the clock error detection signal indicating a failure in the first clocking element; and means for generating, at a clocked error reporting device within the IC core and responsive to the clock error detection signal, a clock error event indication, the clocked error reporting device using a second clocking signal from a second clocking element.

In Example 46, the subject matter of Example 45 optionally includes means for changing, at a clock selection device and responsive to the clock error detection signal, a clock selection from the first clock signal to the second clock signal generated by the second clocking element.

In Example 47, the subject matter of any one or more of Examples 45-46 optionally include means for receiving the clock error event indication at a system-on-a-chip (SOC) device from an integrated circuit (IC) device, the IC device including the first clocking element, the second clocking element, and the clock selection element; and means for generating a clock error handler indication at the SOC device as a function of the clock error event indication.

In Example 48, the subject matter of Example 47 optionally includes wherein the clock error handler indication includes at least one of a clock error interrupt request or a clock error message.

In Example 49, the subject matter of any one or more of Examples 47-48 optionally include wherein the SOC device includes the IC device.

In Example 50, the subject matter of any one or more of Examples 47-49 optionally include means for receiving the error clock event indication at an error latching circuitry; and means for applying a changed voltage level to a SOC error pin, the changed voltage level indicating the failure in the first clocking element.

In Example 51, the subject matter of Example 50 optionally includes means for outputting a latched error signal from an error latch within the error latching circuitry responsive to the receipt of the error clock event indication at the error latch.

In Example 52, the subject matter of any one or more of Examples 50-51 optionally include means for applying, at field effect transistor within the error latching circuitry and responsive to the latched error signal, the changed voltage level to the SOC error pin, the changed voltage level based on a SOC device rail voltage.

In Example 53, the subject matter of Example 52 optionally includes means for generating an OR signal output at a logical OR gate within the error latching circuitry, wherein: the generation of the OR signal output is responsive to receiving at least one of the latched error signal and a hard fault error input; and the application of the changed voltage level to the SOC error pin is responsive to the presence of the OR signal output.

In Example 54, the subject matter of any one or more of Examples 47-53 optionally include means for receiving the clock error detection signal at a clock status register within the first docking element; means for generating a clock error register output responsive to the receipt of the clock error detection signal; means for changing the clock selection at a clock selection multiplexing device within the clock selection device responsive to the clock error register output; and means for outputting the second clock signal from the clock selection multiplexing device to the clocked error reporting device.

In Example 55, the subject matter of Example 54 optionally includes means for receiving a configuration reset input at the clock selection multiplexing device, the configuration reset input indicating a first clocking element error resolution; and means for changing the clock selection, responsive to the clock error detection signal, from the second clock signal to the first clock signal.

In Example 56, the subject matter of any one or more of Examples 54-55 optionally include wherein: the first clocking element includes a first phase-locked loop (PLL); the second clocking element includes a second PLL.

In Example 57, the subject matter of any one or more of Examples 47-56 optionally include wherein: the IC core includes a power management agent; and the power management agent includes the second clocking element internal to the power management agent.

In Example 58, the subject matter of Example 57 optionally includes wherein the power management agent includes the clocked error reporting device.

Example 59 is at least one machine-readable medium including instructions, which when executed by a machine, cause the machine to perform operations of any of the operations of Examples 1-58.

Example 60 is an apparatus comprising means for performing any of the operations of Examples 1-58.

Example 61 is a system perform the operations of any of the Examples 1-58.

Example 62 is a method to perform the operations of any of the Examples 1-58.

The above detailed description includes references to the accompanying drawings, which form a part of the detailed description. The drawings show, by way of illustration, specific embodiments in which the subject matter can be practiced. These embodiments are also referred to herein as "examples," Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to allow the reader to quickly ascertain the nature of the technical disclosure. It is submitted with the understanding that it will not be used to interpret or limit the scope or meaning of the claims. In the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment, and it is contemplated that such embodiments can be combined with each other in various combinations or permutations. The scope should be determined with reference to the appended claims, along with the full scope of equivalents to which such claims are entitled.

The invention claimed is:

1. A clocked integrated circuit (IC) system comprising:
an integrated circuit (IC) core, the IC core including:
a first clocking element to generate a first clock signal, the first clocking element including a clock error detection device to generate a clock error detection signal based on the first clock signal, the clock error detection signal indicating a failure in the first clocking element;
a clocked error reporting device to generate a clock error report responsive to the clock error detection signal, the clock error report generated using a second clock signal from a second clocking element; and
a clock selection device to change a clock selection, responsive to the clock error detection signal, from the first clock signal to the second clock signal generated by the second clocking element;
an error handling device to generate a clock error handler indication responsive to the clock error report; and
an error circuitry to apply a changed voltage level to a system-on-a-chip (SOC) error pin responsive to the clock error report.

2. The system of claim 1, wherein the clock error handler indication includes at least one of a clock error interrupt request or a clock error message.

3. The system of claim 1, further including an SOC device, the SOC device including the IC core and the error handling device, and the error circuitry.

4. The system of claim 1, wherein the error circuitry includes an error latching circuitry to receive the clock error report and apply the changed voltage level to the SOC error pin, the changed voltage level indicating the failure in the first clocking element.

5. The system of claim 4, the error latching circuitry including an error latch, the error latch to output a latched error signal responsive to the clock error report.

6. The system of claim 5, the error latching circuitry further including a field effect transistor to apply the changed voltage level to the SOC error pin responsive to the latched error signal, the changed voltage level based on a SOC device rail voltage.

7. The system of claim 5, the error latching circuitry further including a logical OR gate to generate an OR signal output responsive to receiving at least one of the latched error signal and a hard fault error input, the changed voltage level applied responsive to the OR signal output.

8. The system of claim 1, wherein:
the first clocking element includes a clock status register to receive the clock error detection signal and generate a clock error register output responsive to the clock error detection signal; and
the clock selection device includes a clock selection multiplexing device, the clock selection multiplexing device to:
change the clock selection responsive to the clock error register output; and
output the second clock signal to the clocked error reporting device.

9. The system of claim 8, the clock selection multiplexing device further to:
receive a configuration reset input indicating a first clocking element error resolution; and
change the clock selection, responsive to the clock error detection signal, from the second clock signal to the first clock signal.

10. The system of claim 1, further including a power management agent, the power management agent including the clocked error reporting device.

11. A clocked integrated circuit (IC) method comprising:
generating a first clock signal at a first clocking element in an integrated circuit (IC) core, the first clocking element including a clock error detection device;

generating a clock error detection signal based on the first clock signal at the clock error detection device, the clock error detection signal indicating a failure in the first clocking element;

generating, at a clocked error reporting device within the IC core and responsive to the clock error detection signal, a clock error report, the clock error report generated using a second clock signal from a second clocking element;

changing, at a clock selection device and responsive to the clock error detection signal, a clock selection from the first clock signal to the second clock signal generated by the second clocking element;

generating, at an error handling device, a clock error handler indication responsive to the clock error report; and applying a changed voltage level to a system-on-a-chip (SOC) error pin responsive to the clock error report.

12. The method of claim 11, wherein the clock error handler indication includes at least one of a clock error interrupt request or a clock error message.

13. The method of claim 11, wherein an SOC device includes the IC core.

14. The method of claim 11, further including:
receiving the clock error report at an error latching circuitry; and
applying the changed voltage level from the error latching circuitry to the SOC error pin, the changed voltage level indicating the failure in the first clocking element.

15. The method of claim 14, further including outputting a latched error signal from an error latch within the error latching circuitry responsive to the receiving of the clock error report at the error latch.

16. The method of claim 15, further including applying, at a field effect transistor within the error latching circuitry and responsive to the latched error signal, the changed voltage level to the SOC error pin, the changed voltage level based on a SOC device rail voltage.

17. The method of claim 16, further including generating an OR signal output at a logical OR gate within the error latching circuitry, wherein:
the generation of the OR signal output is responsive to receiving at least one of the latched error signal and a hard fault error input; and
applying the changed voltage level to the SOC error pin is responsive to the OR signal output.

18. The method of claim 11, further including:
receiving the clock error detection signal at a clock status register within the first clocking element;
generating a clock error register output responsive to receiving the clock error detection signal;
changing the clock selection at a clock selection multiplexing device within the clock selection device responsive to the clock error register output; and
outputting the second clock signal from the clock selection multiplexing device to the clocked error reporting device.

19. The method of claim 18, further including:
receiving a configuration reset input at the clock selection multiplexing device, the configuration reset input indicating a first clocking element error resolution; and
changing the clock selection, responsive to the clock error detection signal, from the second clock signal to the first clock signal.

20. At least one non-transitory machine-readable storage medium, comprising a plurality of instructions that, responsive to being executed with processor circuitry of a computer-controlled device, cause the computer-controlled device to:
generate a first clock signal at a first clocking element in an integrated circuit (IC) core, the first clocking element including a clock error detection device;
generate a clock error detection signal based on the first clock signal at the clock error detection device, the clock error detection signal indicating a failure in the first clocking element;
generate, at a clocked error reporting device within the IC core and responsive to the clock error detection signal, a clock error report, the clock error report generated using a second clock signal from a second clocking element;
change, at a clock selection device and responsive to the clock error detection signal, a clock selection from the first clock signal to the second clock signal generated by the second clocking element;
generate, at an error handling device, a clock error handler indication responsive to the clock error report; and
apply a changed voltage level to a system-on-a-chip (SOC) error pin responsive to the clock error report.

21. The non-transitory machine-readable storage medium of claim 20, wherein the clock error handler indication includes at least one of a clock error interrupt request or a clock error message.

22. The non-transitory machine-readable storage medium of claim 20, wherein an SOC device includes the IC core.

23. The non-transitory machine-readable storage medium of claim 20, the instructions further causing the computer-controlled device to:
receive the clock error report at an error latching circuitry; and
apply the changed voltage level from the error latching circuitry to the SOC error pin, the changed voltage level indicating the failure in the first clocking element.

24. The non-transitory machine-readable storage medium of claim 20, the instructions further causing the computer-controlled device to:
receive the clock error detection signal at a clock status register within the first clocking element;
generate a clock error register output responsive to the clock error detection signal;
change the clock selection at a clock selection multiplexing device within the clock selection device responsive to the clock error register output; and
output the second clock signal from the clock selection multiplexing device to the clocked error reporting device.

25. The non-transitory machine-readable storage medium of claim 24, the instructions further causing the computer-controlled device to:
receive a configuration reset input at the clock selection multiplexing device, the configuration reset input indicating a first clocking element error resolution; and
change the clock selection, responsive to the clock error detection signal, from the second clock signal to the first clock signal.

* * * * *